(12) United States Patent
Tally

(10) Patent No.: US 7,597,088 B2
(45) Date of Patent: Oct. 6, 2009

(54) APPARATUS AND METHOD FOR BOOSTING ENGINE PERFORMANCE

(75) Inventor: William Tally, Dove Canyon, CA (US)

(73) Assignee: MJ Acquisitions, Inc., Grosse Pointe Farms, MI (US)

( * ) Notice: Subject to any disclaimer, the term of this patent is extended or adjusted under 35 U.S.C. 154(b) by 174 days.

(21) Appl. No.: 11/467,128

(22) Filed: Aug. 24, 2006

(65) Prior Publication Data

US 2007/0175456 A1   Aug. 2, 2007

Related U.S. Application Data

(60) Provisional application No. 60/711,610, filed on Aug. 26, 2005.

(51) Int. Cl.
*F02B 33/00* (2006.01)

(52) U.S. Cl. .................... 123/559.1; 123/563

(58) Field of Classification Search ................. 123/184.21–184.61, 559.1–566
See application file for complete search history.

(56) References Cited

U.S. PATENT DOCUMENTS

| | | | |
|---|---|---|---|
| 1,883,464 A | 10/1932 | Ball | |
| 2,571,256 A | 10/1951 | King | |
| 2,963,006 A | 12/1960 | Karde | |
| D212,877 S | 12/1968 | Krans | |
| 3,641,746 A | 2/1972 | Smith et al. | |
| 4,058,096 A | 11/1977 | Brown | |
| 4,723,526 A | 2/1988 | Horiuchi et al. | |
| 4,831,981 A | 5/1989 | Kitano | |
| 4,878,460 A | 11/1989 | Uchida et al. | |
| 4,896,734 A | 1/1990 | Horiuchi et al. | |
| 4,911,135 A | 3/1990 | Nishimura et al. | |
| 4,977,865 A | 12/1990 | Hiraoka et al. | |
| 5,012,771 A | 5/1991 | Oda et al. | |
| 5,058,558 A | 10/1991 | Ueda et al. | |
| 5,085,199 A | 2/1992 | Sado et al. | |
| D328,063 S | 7/1992 | Yunes | |
| 5,392,751 A | 2/1995 | Matsubara et al. | |
| 5,448,982 A | 9/1995 | Arakawa et al. | |
| 5,911,211 A | 6/1999 | Uchida | |

(Continued)

FOREIGN PATENT DOCUMENTS

AU   2006202679 C1   10/2006

(Continued)

*Primary Examiner*—Thomas Denion
*Assistant Examiner*—Douglas J. Duff
(74) *Attorney, Agent, or Firm*—Clark Hill PLC

(57) ABSTRACT

A supercharger (10) is positioned in the valley of an automobile engine (60) so that it fits under the engine hood (25). The supercharger (10) has a low profile air inlet (14) at the top that passes air to an inlet tube (16). The height of the inlet tube (16) decreases and its width expands as the inlet tube (16) extends away from the air inlet (14) to keep a low profile while minimizing restrictions to airflow. The inlet tube (16) supplies air to a compressor (18) at the bottom. The pressurized air flows through a large and thin intercooler (24) directly above the compressor (18). The cooled air is fed to long and straight intake manifold runners (28) positioned above the engine heads (61, 62) of the engine (60). The supercharger (10) provides a large volume of low pressure and low temperature air charge to the engine (60).

21 Claims, 6 Drawing Sheets

U.S. PATENT DOCUMENTS

| | | |
|---|---|---|
| 6,006,540 A | 12/1999 | Coletti |
| 6,021,764 A | 2/2000 | Koyama |
| 6,029,637 A | 2/2000 | Prior |
| 6,079,394 A | 6/2000 | Abthoff et al. |
| D429,672 S | 8/2000 | Miyagishma et al. |
| 6,098,586 A | 8/2000 | Bloomer |
| 6,227,179 B1 | 5/2001 | Eiermann et al. |
| 6,405,692 B1 | 6/2002 | Christiansen |
| 6,463,901 B1 | 10/2002 | Cuddihee, Sr. et al. |
| D491,503 S | 6/2004 | Zyskowski |
| 6,837,195 B2 | 1/2005 | Suwazono |
| 6,923,166 B2 | 8/2005 | Barnes et al. |
| 6,941,926 B2 * | 9/2005 | Fagala .................. 123/336 |
| 7,011,079 B2 * | 3/2006 | Park .................. 123/559.1 |
| D528,482 S | 9/2006 | Hamburger |
| 7,137,384 B1 | 11/2006 | Kavadeles |
| 7,201,157 B1 | 4/2007 | Kavadeles |
| 2005/0150483 A1 | 7/2005 | Sorensen et al. |
| 2006/0157036 A1 | 7/2006 | Andersen |
| 2007/0107704 A1 | 5/2007 | Billings et al. |
| 2008/0083575 A1 | 4/2008 | Smith |

FOREIGN PATENT DOCUMENTS

| | | |
|---|---|---|
| AU | 2006100924 A5 | 11/2006 |
| WO | WO 2006/099668 A1 | 9/2006 |

\* cited by examiner

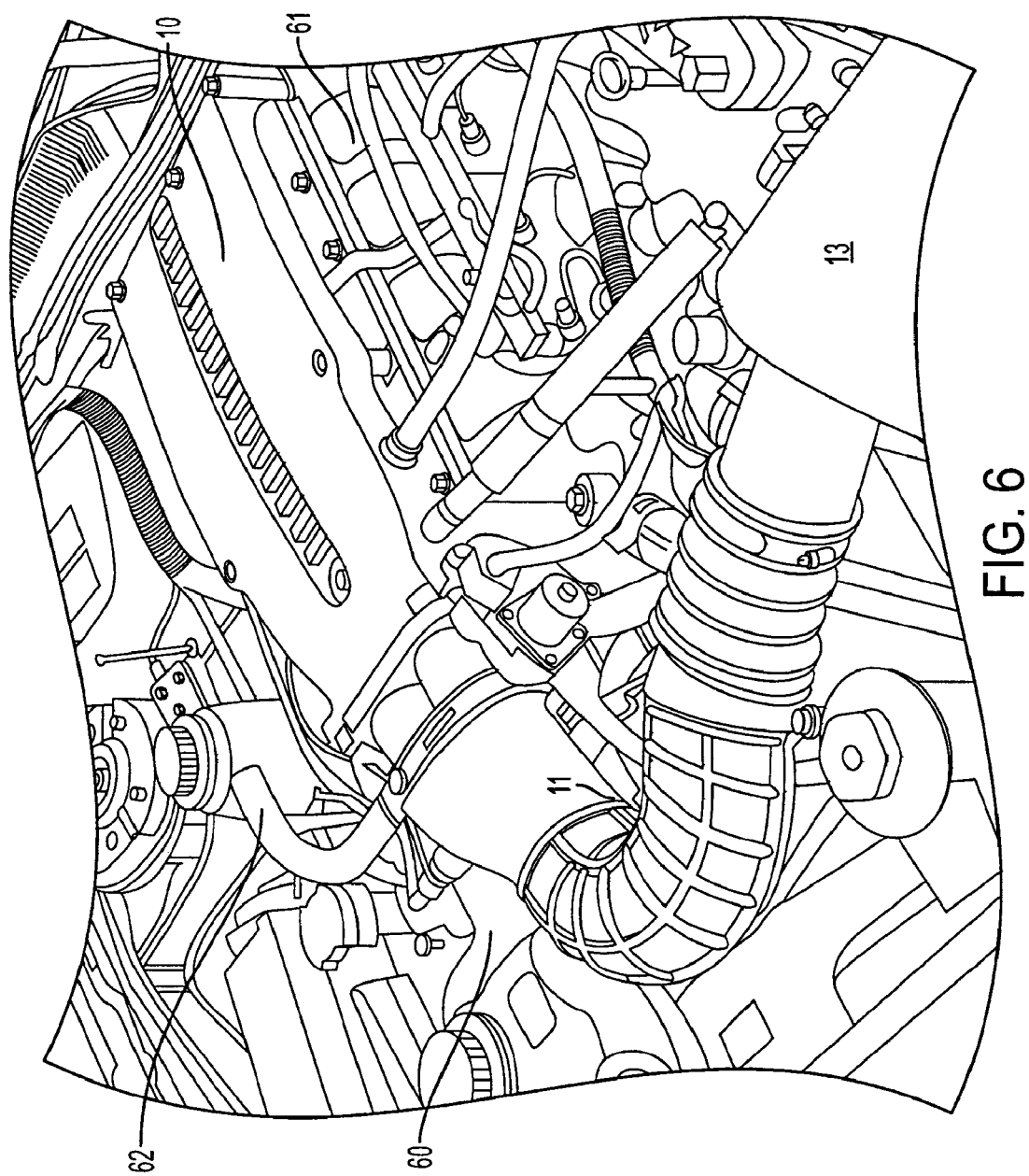

APPARATUS AND METHOD FOR BOOSTING ENGINE PERFORMANCE

FIELD OF THE INVENTION

The present invention generally relates to an apparatus and method for improving the performance of an internal combustion engine, and, more particularly, to a supercharger for an automobile engine.

BACKGROUND OF THE INVENTION

A gasoline internal combustion engine typically takes in the air and fuel mixture, which is often referred to as charge, needed for driving the engine via the negative pressure generated during the intake strokes. An engine with larger cylinders can take in more charge and, therefore, generate more power. One approach for increasing the engine power without increasing the engine size and weight is using a gas compressor in the intake track of the engine to compress the intake air above atmospheric pressure. The gas compressor forces more charge into the engine cylinders, thereby increasing the volumetric efficiency of the engine beyond that of a normally aspired engines without the gas compressor.

The intake gas compressor is generally referred to as a supercharger. A supercharger typically includes an air inlet at the top. A compressor is located directly below the air inlet and compresses the air flowing from the air inlet. The compressed air flows through an intercooler at the bottom of the supercharger. The cooled and boosted air is fed into the engine cylinders via the engine intake manifold runners.

An intake gas compressor can be exhaust gas driven or mechanically driven. An exhaust gas driven intake gas compressor is also referred to as a turbo supercharger or a turbocharger. A mechanically driven intake gas compressor is conventionally referred to as a supercharger and is mechanically coupled to the engine crankshaft by a belt, a chain, or a gearbox. A turbocharger is generally smaller than a mechanically driven supercharger. However, the turbo lag associated with a turbocharger often results in less than desirable driving experience, especially in high performance sports cars.

Sports car enthusiasts often buy mass produced cars with a normally aspired engines and have after market superchargers installed to improve the performance of the cars. A specialty vehicle manufacturer may produce high performance sports cars by installing superchargers on normally aspired stock cars made by major automobile manufacturers. Mass produced normally aspired cars, especially compact cars, usually have very limited space in the engine bays to accommodate additional components such as superchargers.

An engine hood scoop can provide the extra space for a supercharger. However, the hood scoop deteriorates the aerodynamic characters of the car, resulting in poorer performance, lower fuel efficiency, and more wind noise. In order to fit a supercharger under the engine hood without a hood scoop, the supercharger may be installed in the valley between the engine heads of a V-engine to lower its profile. Such a supercharger arrangement requires the engine intake runners to run from the intercooler at the bottom of the supercharger located in the valley of the V-engine up to the engine heads. As the engine intake valves of a V-engine are located at the top of the engine heads, the runners include at least two sharp bends, one near the bottom of the supercharger and another near the engine heads. Sharp bends in the runners restrict the charge flow and deteriorate the engine performance. Furthermore, it will increase the pressure and temperature of the charge. High pressure and high temperature charge increases likelihood of engine detonation, thereby requiring high octane fuel and negatively impacting the engine life. High temperature charge also decreases the thermal efficiency of the engine.

Accordingly, it would advantageous to have a low profile intake gas compressor, or supercharger, that can fit under an engine hood without the hood scoop. It is desirable for the supercharger to have a large airflow to improve the volumetric efficiency of the engine. It is also desirable for the supercharger to have a low boost pressure to minimize its impact on the engine life. In addition, it is desirable for the supercharger to force a low temperature charge into the engine to improve the engine's efficiency, avoid detonation, and allow the engine to run on low octane fuels. It is of further advantage for the supercharger to be simple, inexpensive, and reliable.

BRIEF DESCRIPTION OF THE DRAWINGS

FIG. 6 is a schematic diagram illustrating a supercharger positioned in the engine bay of an automobile in accordance with an embodiment of the present invention.

DETAILED DESCRIPTION OF VARIOUS EMBODIMENTS

Figure 1:
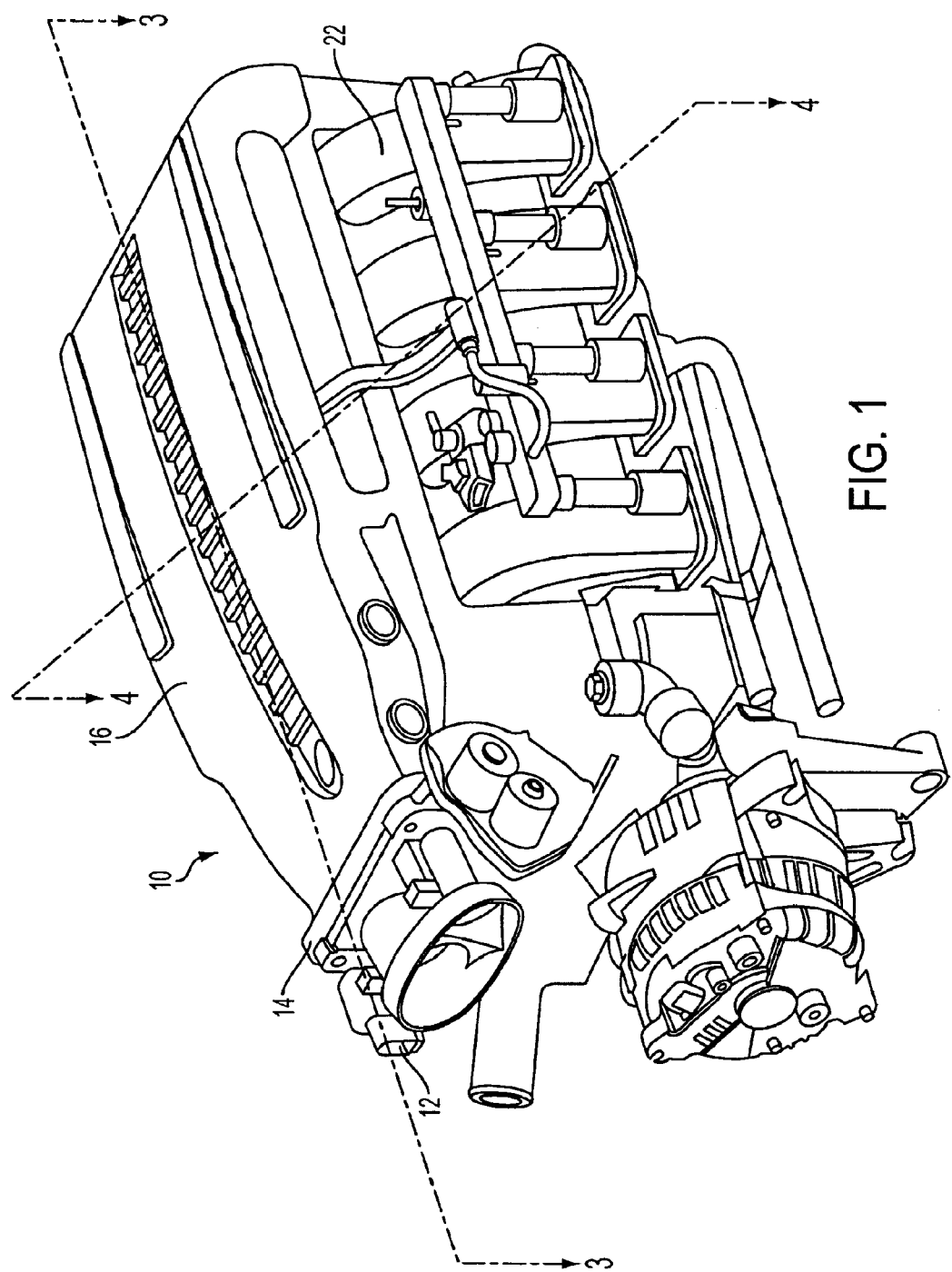
FIG. 1 is a schematic diagram illustrating a perspective view of a supercharger for an internal combustion engine in accordance with an embodiment of the present invention.

Various embodiments of the present invention are described herein below with reference to the figures, in which elements of similar structures or functions are represented by like reference numerals throughout the figures. It should be noted that the figures are only intended to facilitate the description of the preferred embodiments of the present invention. They are not intended as an exhaustive description of the present invention or as a limitation on the scope of the present invention. Furthermore, the figures are not necessarily drawn to scales.

FIGS. 1, 2, 3, 4, 5, and 6 illustrate an apparatus 10 for boosting engine performance in accordance with an embodiment of the present invention. Specifically, apparatus 10 is a low profile supercharger 10. By way of example, supercharger 10 feeds air charge into a V-shaped eight cylinder (V-8) engine 60. Also by way of example and as shown in FIG. 6, supercharger 10 is nestled in a valley between engine heads 61 and 62 of engine 60 in accordance with a preferred embodiment of the present invention.

Figure 2:
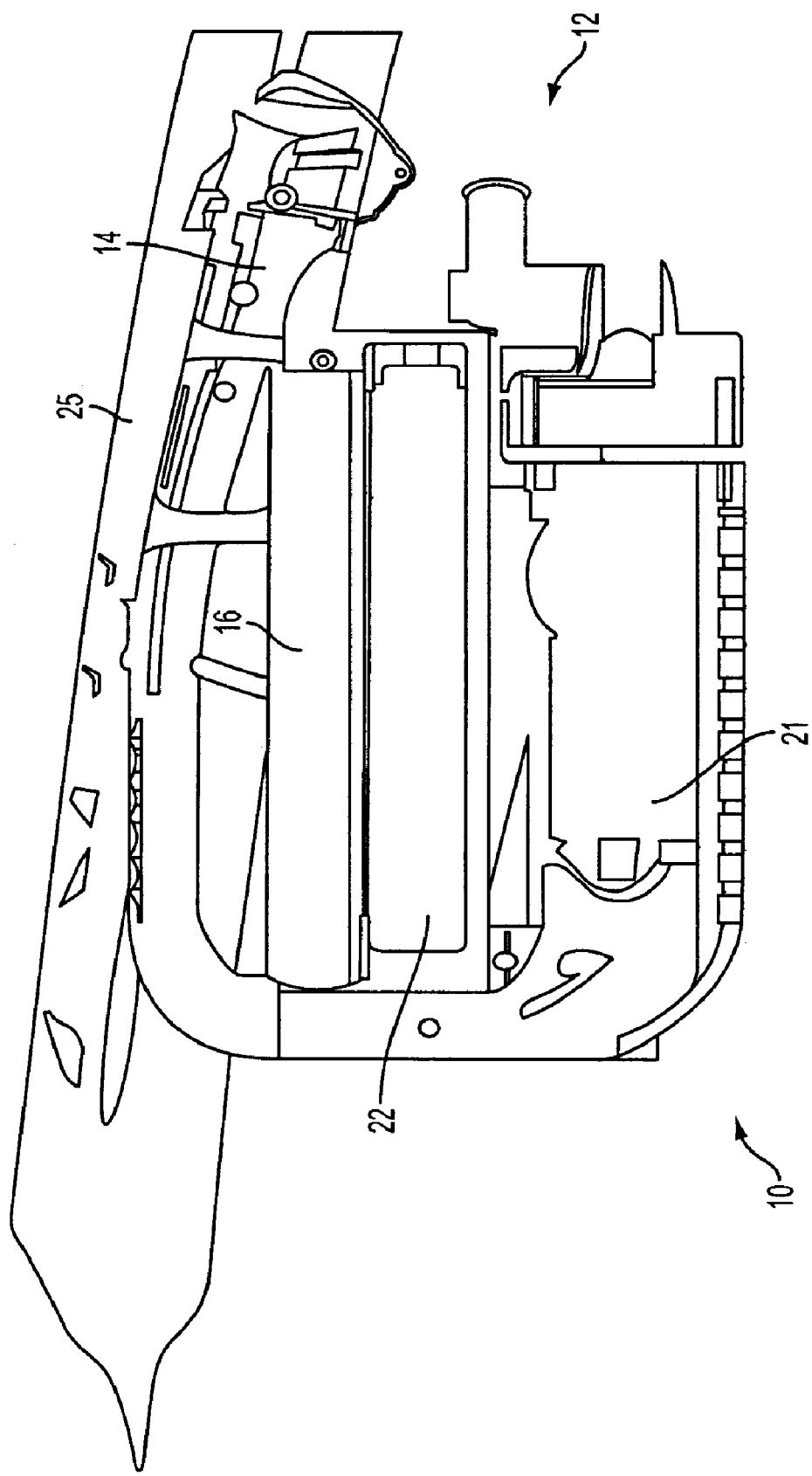
FIG. 2 is a schematic diagram illustrating a partial side view of a supercharger positioned under the hood of an automobile in accordance with an embodiment of the present invention.
Figure 3:
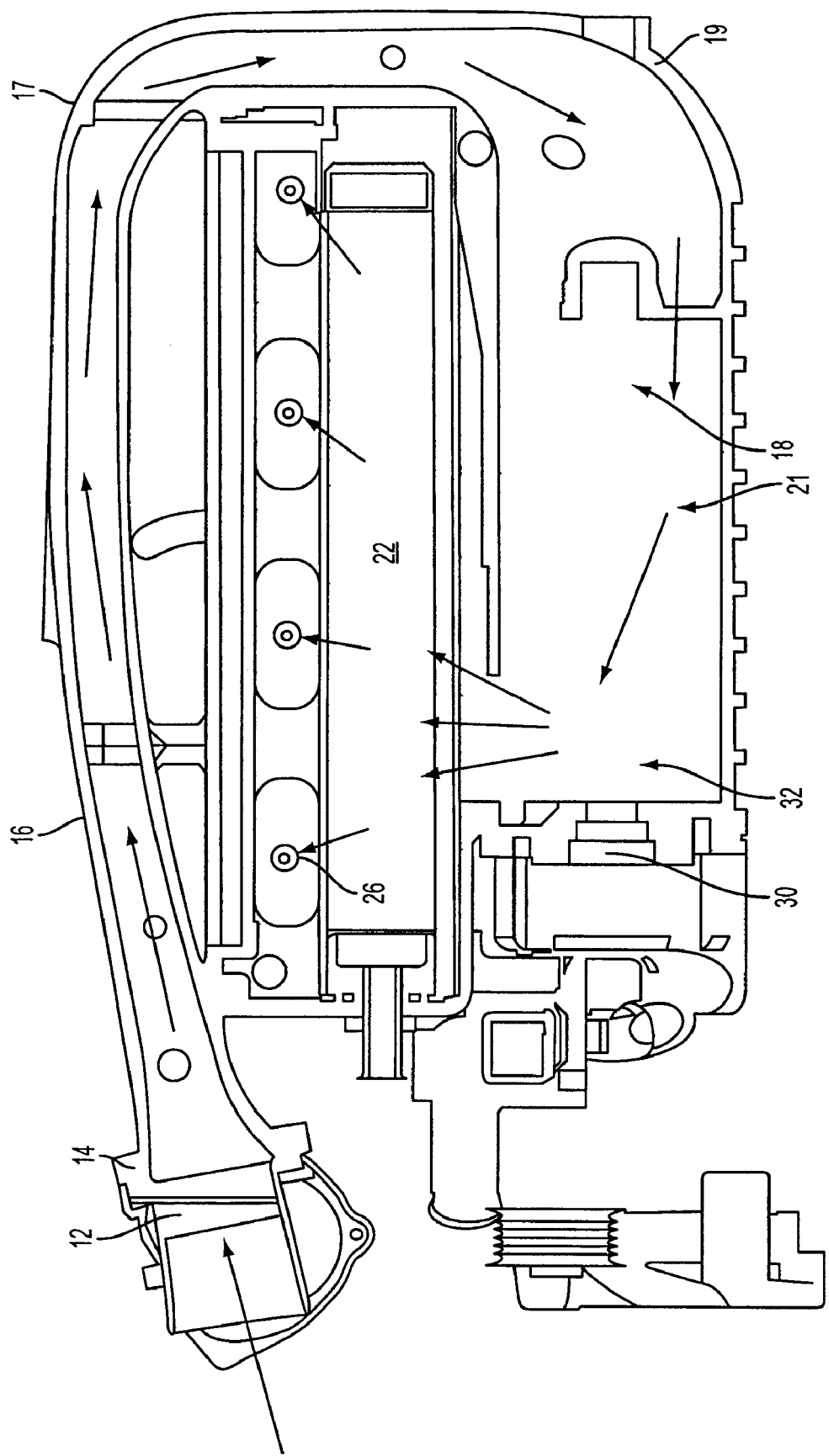
FIG. 3 is a schematic diagram illustrating a cross-sectional view of the supercharger taken generally along lines III-III in FIG. 1.
Figure 4:
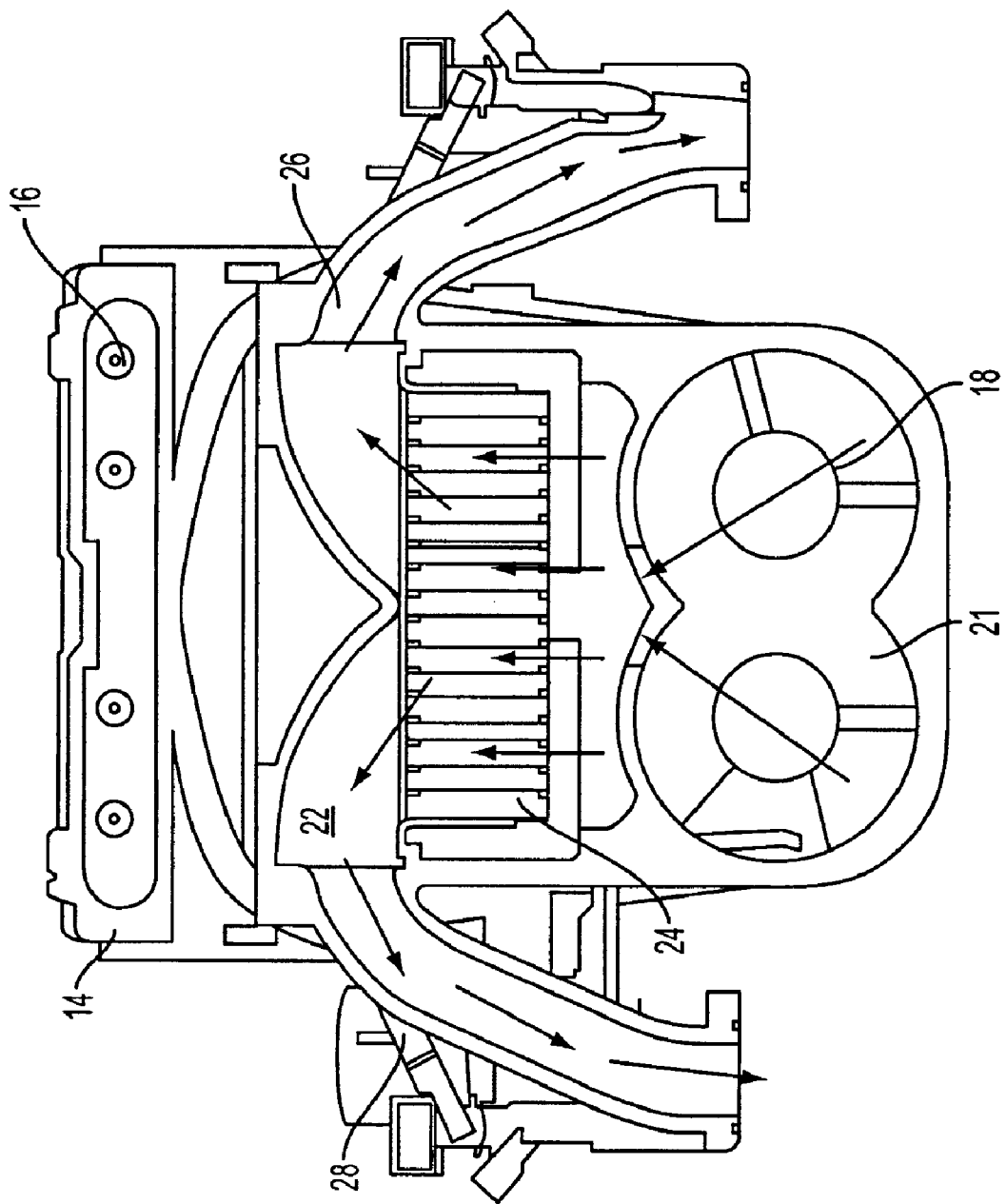
FIG. 4 is a schematic diagram illustrating a cross-sectional view of the supercharger taken generally along lines IV-IV in FIG. 1.

Supercharger 10 includes a throttle body 12 in the front connected to an air inlet 14 at top of supercharger 10 for taking in fresh air. Throttle body 12 is also connected to an intake air path tube 11 to an air filter 13 (shown in FIG. 6). An intake or pre-boost air passage 16 couples air inlet 14 to a compressor 18 located in a compressor chamber 21. As shown in FIGS. 2, 3, and 4, compressor chamber 21 is at the bottom of supercharger 20 remote from the section of air passage 16 at the top of supercharger 10. As shown in FIGS. 2 and 3, intake air passage 16 runs from air inlet 14, first along the top and then down along one side, e.g., the rear side, of supercharger 10, to an air outlet integrally coupled to compressor chamber 21 at the bottom of supercharger 10. In accordance with a preferred embodiment, cross-sectional areas of air inlet 14 and air passage 16 are sufficient large to provide unrestricted airflow for feeding charge into engine 60. As shown in FIGS. 2 and 3, the rear side of supercharger 10 is substantially perpendicular to the top of supercharger 10 in accordance with a specific embodiment of the present invention.

Air inlet 14 preferably has a low height and wide width, i.e., a low aspect ratio. Likewise, air passage 16 preferably has a low aspect ratio so that supercharger 10 can fit under an engine hood 25 (shown in FIG. 2) without a hood scoop. By way of example, the cross-sectional areas of air inlet 14 and air passage 16 are preferably about ninety square centimeters (90 cm$^2$) when the cylindrical volume of engine 60 is about four liters. In a specific embodiment, the vertical dimension of inlet 14 is about 2.7 centimeters and its horizontal width is about 23.0 centimeters. In other words, inlet 14 has an aspect ratio of approximately 0.12. In accordance with other embodiments of the present invention, air inlet 14 and air passage 16 may have other dimensions and aspect ratios, e.g., aspect ratios ranging between 0.1 and 0.5, etc.

In accordance with a specific embodiment, the vertical dimension of air passage 16 further shrinks and its horizontal width increases as air passage 16 runs from air inlet 14 toward the rear of supercharger 10, thereby achieving a low profile while maintaining the cross-sectional area for the pre-boost airflow. At the rear of supercharger 10, air passage 16 bends downward in a bent section 17. Near the bottom of supercharger 10, air passage 16 bends again in a bent section 19 toward gas compressor 18. In accordance with a preferred embodiment of the present invention, the cross-sectional area of air passage 16 increases further around bent sections 17 and 19 to minimize the restriction to the airflow that might be caused by the bending of air passage 16.

In compressor chamber 21 at the bottom of supercharger 10, compressor 18, which is also referred to as a booster or a blower, compresses the air flowing from intake air passage 16. In accordance with a preferred embodiment of the present invention, compressor 18 is a twin-screw type booster that pulls air through a pair of meshing lobes. As the air passes through the meshing lobes in the twin-screw type booster, the air pocket decreases in size and eventually pops as it exits compressor 18. Compressor 18 is mechanically couple to the crankshaft of engine 60 via a belt, a chain, or a gear. Preferably, the mechanical coupling is such that compressor 18 rotates at a speed higher than that of engine 60, thereby ensuring that compressor 18 generates a positive air pressure. In accordance with a specific embodiment of the present invention, the twin lobes push about 2,300 cubic centimeters (cc) of air through compressor 18 per rotation. The twin-screw type compressor is preferred because it offers a good balance between thermal efficiency and boost power at low rotation speed. However, it should be understood that compressor 18 is not limited to being a twin-screw type compressor. In accordance with an embodiment of the present invention, supercharger 10 may include other types of compressor, e.g., a Roots type compressor or a centrifugal type compressor.

The compressed or boosted air exits compressor 18 in compressor chamber 21 and enters a plenum 22 directly above compressor chamber 21. In plenum 22, the boosted air flows through an intercooler 24 in accordance with a preferred embodiment of the present invention. Plenum 22 preferably has a large cross-sectional area to minimize the restriction to the airflow and to accommodate a large cross-sectional area intercooler 24. Intercooler 24 having a large cross-sectional area is preferred because of its high heat exchange efficiency. A large cross-sectional area intercooler 24 can have a relatively small thickness, e.g., a thickness between approximately 0.5 cm and approximately 3 cm. Thin intercooler 24 minimizes the restriction to the airflow. Consequently, the air pressure drop across intercooler 24 is small. In accordance with a preferred embodiment, intercooler 24 is liquid cooled. However, this is not a limitation on the scope of the present invention. In accordance with an alternative embodiment of the present invention, intercooler 24 is air cooled. Engine hood 25 (shown in FIG. 2) preferably has one or more air vents to direct cold air to an air cooled intercooler in supercharger 10.

After flowing through intercooler 24, the cooled air flows to the top of plenum 22 and into intake ports 26 of engine intake manifold runners 28 (FIGS. 3 and 4). By way of example, FIG. 3 shows engine 60 as a V-8 engine having four intake runners on each side of the engine intake manifold. In accordance with an embodiment of the present invention, compressor 18 is at the bottom of supercharger 10 and deep in the valley between engine heads 61 and 62, while intercooler 24 is near the top of supercharger 10 above engine heads 61 and 62. Therefore, intake ports 26 are located above engine heads 61 and 62. This structural arrangement of the different components in supercharger 10 enables intake runners 28 to be long with minimum bends and minimum restriction to the airflow. As shown in FIG. 4, each of runners 28 in supercharger 10 has only one obtuse bend from intake port 26 to engine head 61 or 62 in accordance with a preferred embodiment of the present invention. Such long and beefy downdraft runners 28 with minimal bends are advantageous for maximizing torque and power. They provide straight and direct shot into the cylinders that maximizes the airflow. Long and straight intake manifold runners 28 allows a large amount of air charge to be pumped into engine 60 without having to use as much pressure as in the runners of conventional superchargers. The reduced pressure of the air in intake manifold runners 28 also minimizes the generation of heat in the air charge.

Figure 5:
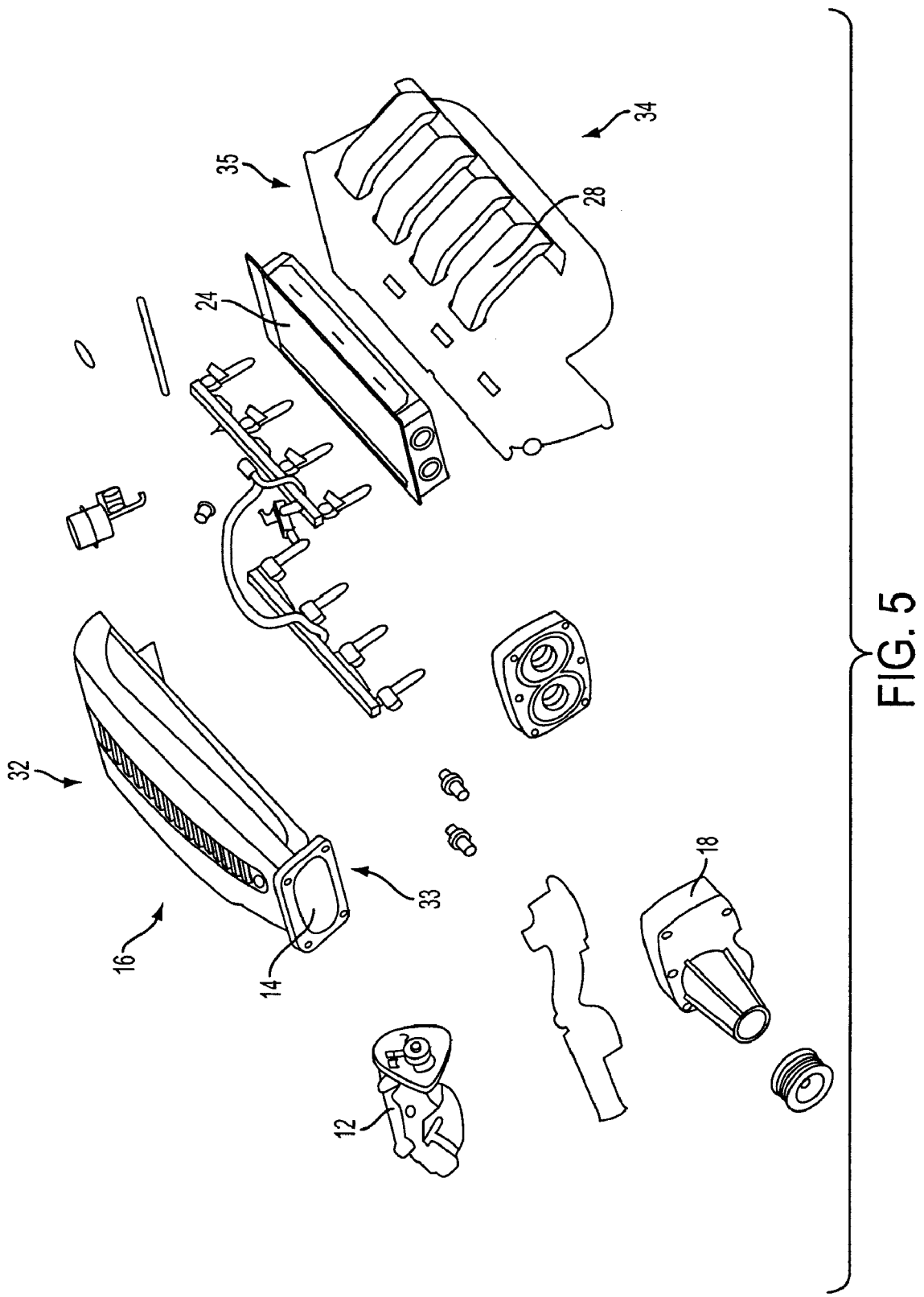
FIG. 5 is a schematic diagram illustrating an exploded view of a supercharger for an internal combustion engine in accordance with an embodiment of the present invention.

In accordance with a preferred embodiment of the present invention, the outer casing of supercharger 10 is made up of a top piece, element, or unit 32 and a bottom piece, element, or unit 34 (FIG. 5). Top piece 32 includes inlet 14, the top section of air passage 16, and a top potion or simply a cover of plenum 22. Bottom piece 34 includes the rear section of air passage 16, a bottom portion of plenum 22 for housing intercooler 24 and compressor chamber 21 for housing compressor 18, and runners 28. As shown in FIG. 5, the bottom portion of plenum 22 includes both the floor and the sidewalls. Runners 28 have their intake ports formed in upper sections of the sidewalls of plenum 22. Top piece 32 and bottom piece 34 can be made of cast or forged metals. Top piece 32 and bottom piece 34 can be mechanically coupled to each other by such mechanical fastening devices as screws, bolts and nuts, clips, latches, etc. In order to maintain the positive air pressure in compressor chamber 21 and plenum 22, a seal (not shown in FIG. 5) is preferably disposed between mating or sealing surfaces 33 and 35 of top piece 32 and bottom piece 34, respectively. Supercharger 10 with a small number of sealing surfaces is beneficial because of its high efficiency and high reliability in maintaining the positive air pressure in supercharger 10. The two piece outer casing structure makes supercharger 10 simple, reliable, and easy to maintain. The components, e.g., intercooler 24 and compressor 18, of supercharger 10 can be easily accessed for maintenance, repair, or replacement by loosening the mechanical fasteners, e.g., bolts that bolt top piece 32 and bottom piece 34 together, and removing top piece 32.

Supercharger 10 may include a supercharge bypass (not shown in the figures) in accordance with an embodiment of the present invention. In accordance with a preferred embodiment, the bypass is activated at low engine speed when there is no need for the engine boost. The bypass functions to reduce heat buildup in the engine and provide optimal engine performance under difference driving conditions.

By now it should be appreciated that a low profile intake gas compressor or supercharger has been provided. In accordance with an embodiment of the present invention, the supercharger has a low profile pre-boost air passage running along the top and rear of the supercharger to a compressor at the bottom of the supercharger. The boosted air flows upwards through a large area and thin intercooler into a plenum near the top of the supercharger. From the plenum, the air is fed to the engine intake manifold runners. In accordance with a preferred embodiment of the present invention, the supercharger is installed in the valley of a V-engine so that it can fit under the engine hood of a stock car without a hood scoop.

In addition, the intercooler above compressor design of the supercharger in accordance with an embodiment of the present invention results in long downdraft intake runners with minimum bends, which is advantageous in feeding large quantities of low boost pressure, e.g., about 30 kilopascal (kPa) or 4.5 pounds per square inch (psi), and low temperature, e.g., about 65 degrees Celsius (° C.) or 150 degrees Fahrenheit (° F.), air charge into the engine. The low boost pressure and low temperature place less strain on the engine and also reduce the chance of detonation. These advantages are achieved while still improving engine power gains. Specifically, the long and straight runners are beneficial for producing high torque and power at low engine speeds. For example, a supercharger in accordance with a specific embodiment of the present invention installed on a four-liter V-8 engine boosts the engine power to about 400 horsepower or about 300 kilowatts and with about 420 lb-ft or about 570 N-m of torque.

A supercharger in accordance with a preferred embodiment of the present invention has as few as only one sealing surface. Its outer casing can be made up of as few as only one top piece and one bottom piece. Therefore, the supercharger has a high air sealing efficiency and is simple, reliable, and easy to maintain or repair.

While specific embodiments of the present invention have been described herein above, they are not intended as limitations on the scope of the invention. Present invention provides a low profile, low boost pressure, and low temperature booster for an internal combustion engine. The low profile is achieved via the low aspect ratio of air inlet and the pre-boost air passage, as well as the overall arrangement of the different components in the supercharger. The low boost pressure and low temperature are achieved by the large cross sectional area pre-boost air passage, large area and thin intercooler, and large and straight post-boost air passage runners. The scope of the present invention covers any combination of the above described features and their combinations with other features.

Those skilled in the art will appreciate that various adaptations and modifications of the described embodiments can be configured without departing from the scope and spirit of the invention. Therefore, it should understood that, within the scope of the claims, the invention may be practiced other than as specifically described herein. For example, a supercharger in accordance with an embodiment of the present invention can have more than one sealing surfaces and its outer casing can be made up of more than one top piece and one bottom piece. Even though the specification describes a mechanically driven supercharger for a V-engine of an automobile, a turbo booster or turbo supercharger is within the scope of the present invention. In addition, a supercharger in accordance with an embodiment of the present invention can be installed on other types of engines in different applications, e.g., an inline gasoline engine, a diesel engine, a stationary engine, a boat engine, etc. Furthermore, those phrases describing the orientation or directions, e.g., up, down, above, below, front, rear, top, bottom, are used in the specification for the ease of describing the various embodiments of the present invention with reference to the drawings. These phrases are not intended to impost any limitation on the scope of the present invention. The present invention can be practiced with superchargers with different orientations.

The invention claimed is:

1. An apparatus for boosting engine performance, comprising:
   an air passage having an inlet, a first section coupled to the inlet, a second section coupled to and substantially perpendicular to the first section, and an outlet coupled to the second section, the cross section of said air passage proximate the inlet having an aspect ratio of less than 0.15;
   a chamber remote from the first section of said air passage, said chamber having an entrance coupled to the outlet of said air passage and an exit;
   a compressor in said chamber;
   a plenum between said chamber and the first section of said air passage, said plenum communicating with said chamber through the exit of said chamber; and
   at least one intake runner running from said plenum to at least one cylinder of an internal combustion engine.

2. The apparatus of claim 1, wherein the aspect ratio of the cross section of said air passage decreases in the first section running from the inlet in a direction of air flow through said air passage.

3. The apparatus of claim 1, wherein a cross-sectional area of said air passage at a bend that couples the first section and the second section of said air passage together is greater than a cross-sectional area of the first section of said air passage.

4. The apparatus of claim 1, wherein:
   the first section of said air passage and a first portion of said plenum adjacent said air passage are formed from a first piece of casing; and
   the second section of said air passage, said chamber, and a second portion said plenum adjacent said chamber are formed from a second piece of casing.

5. The apparatus of claim 4, wherein said first piece of casing and the second piece of casing are fastened together with a sealing surface there between.

6. The apparatus of claim 1, further comprising an intercooler in said plenum and having a thickness less than three centimeters.

7. The apparatus of claim 1, said compressor including a twin-screw type compressor.

8. The supercharger of claim 1, said at least one intake runner running from said plenum to the at least one cylinder of the internal combustion engine having one obtuse bend near said plenum.

9. A supercharger for boosting an internal combustion engine having a plurality of cylinders in a V-configuration and engine heads associated with the cylinders, the supercharger comprising:
- a booster chamber located below the engine heads in a valley of the internal combustion engine in the V-configuration, said booster chamber having an inlet and an outlet;
- an intake air tube having a first section and a second section and coupled to the inlet of said booster chamber;
- a plenum between said booster chamber and the first section of said intake air tube, the plenum being spaced apart from the first section of the intake air tube and communicating with said booster chamber via the outlet;
- a first group of engine intake runners communicating with said plenum via a first set of intake ports above the engine heads of the internal combustion engine;
- a second group of engine intake runners communicating with said plenum via a second set of intake ports above the engine heads of the internal combustion engine;
- a booster in said booster chamber and configured to pump air from said intake air tube to said plenum; and
- an intercooler in said plenum below the first and second sets of intake ports, said intercooler having a thickness equal to or less than three centimeters.

10. The supercharger of claim 9, wherein each of said first and second groups of intake runners has one obtuse bend near said plenum.

11. The supercharger of claim 9, wherein:
the first section of said intake air tube has a first aspect ratio near an intake air tube inlet and a second aspect ratio near a transition between the first section and the second section lower than the first aspect ratio.

12. The supercharger of claim 9, wherein:
the first section of said intake air tube and a first portion of said plenum adjacent the first section of said intake air tube are formed from a first piece of metal casing;
the second section of said intake air tube, said booster chamber, and a second portion of said plenum adjacent said booster chamber are formed from a second piece of metal casing; and
said first and second pieces of metal casing are fastened together with a sealing surface there between.

13. A method for boosting engine performance, comprising:
establishing an intake air path from an intake air inlet to a compressor chamber, the intake air path having a first section and a second section substantially perpendicular to the first section;
compressing air in the compressor chamber;
driving compressed air into a plenum located between the compressor chamber and the first section of the intake air path, the plenum being defined by a wall spaced apart from a wall defining the intake path;
cooling the compressed air in the plenum using a liquid cooled intercooler having a thickness smaller than three centimeters; and
feeding the compressed air into a plurality of runners via a plurality of runner intake ports located in the plenum and adjacent the first section of the intake air path, each of the plurality of runners having one obtuse bend from the corresponding runner intake port to a corresponding cylinder in an internal combustion engine.

14. The method according to claim 13, wherein establishing an intake air path includes forming the intake air path having an aspect ratio less than 0.4.

15. The method according to claim 13, further comprising:
casting a first metal element to integrally form the first section of the intake air path and an upper section of the plenum;
casting a second metal element to integrally form the second section of the intake air path, the compressor chamber, and a lower section of the plenum; and
fastening the first metal element and the second metal element together with a sealing surface therebetween.

16. The method according to claim 15, further comprising positioning an assembly formed by the first metal element and the second metal element in a valley of the internal combustion engine in a V-configuration, with the plurality of runner intake ports above a plurality of engine heads of the internal combustion engine in the V-configuration.

17. The supercharger of claim 11, wherein a cross-sectional area of said intake air tube at a bend that couples the first section and the second section of said intake air tube is greater than a cross-sectional area of the first section of said intake air tube.

18. A supercharger for an internal combustion engine having a plurality of cylinders in a V-configuration and cylinder heads defining a valley therebetween, the supercharger comprising:
- intake runners each including an intake port positioned above the cylinder heads and an exit port adapted to be in communication with one of the cylinder heads;
- a chamber located between the cylinder heads in the valley of the internal combustion engine, at least a portion of the chamber being located below the interconnection of the cylinder heads and the exit ports, the chamber having an inlet and an outlet;
- a plenum positioned between the chamber and the intake ports and in communication with the chamber via the outlet;
- a compressor in the chamber configured to pump air from the inlet to the intake runner exit port; and
- a substantially parallelepiped-shaped intercooler positioned within the plenum and below the intake ports, wherein the intercooler has a thickness equal to or less than three centimeters.

19. The supercharger of claim 18, wherein each intake runner is defined as a passageway interconnecting one of the engine cylinders and the plenum, each intake runner including a bend proximate the plenum and ranging between ninety and one hundred and eighty degrees.

20. The supercharger of claim 18, wherein the plenum is divided into a first chamber for providing air to the intake runners associated with one of the heads and a second chamber for providing air to the intake runners associated with the other head.

21. The supercharger of claim 18, wherein the intake ports are vertically oriented at the transition between the plenum and the intake runners.

* * * * *